No. 896,393. PATENTED AUG. 18, 1908.
W. K. KIGHT.
LENS.
APPLICATION FILED APR. 22, 1908.

Witnesses
George Ladson
A. J. McCauley

Inventor,
William K. Kight.
By Bakewell Cornwall, Attys.

UNITED STATES PATENT OFFICE.

WILLIAM K. KIGHT, OF DEXTER, MISSOURI, ASSIGNOR TO UNIVERSAL LENS COMPANY, OF WAVERLY, KANSAS, A CORPORATION OF KANSAS.

LENS.

No. 896,393.  Specification of Letters Patent.  Patented Aug. 18, 1908.

Application filed April 22, 1908. Serial No. 428,665.

*To all whom it may concern:*

Be it known that I, WILLIAM K. KIGHT, a citizen of the United States, residing at Dexter, Stoddard county, Missouri, have invented a certain new and useful Improvement in Lenses, of which the following is a full, clear, and exact description, such as will enable others skilled in the art to which it appertains to make and use the same, reference being had to the accompanying drawings, forming part of this specification, in which—

Figure 1:
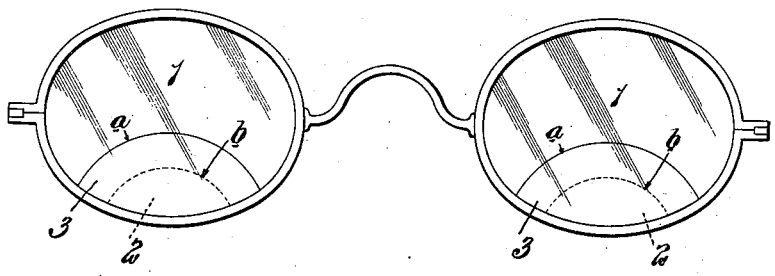
Figure 2:
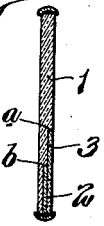

Figure 1 is an elevational view of a pair of eye glasses showing my improved lenses in position therein; and Fig. 2 is a sectional view through one of the lenses.

This invention relates to a new and useful improvement in lenses for eye glasses, being designed particularly as an improvement upon the trifocal lenses illustrated in Patents Nos. 803,907, 803,908 and 803,909, granted November 7, 1905.

The object of the present invention is to render the contiguous edges of the lenses practically invisible so that the vision of the wearer in passing from long distance to intermediate distance, or reading distance, is more perfectly blended by the absence of interruption occasioned by a distinct line. The patents aforesaid show and describe several methods of arranging the several lenses, as by superposing them upon the main lens or upon each other, or arranging them in substantially the same vertical plane, but in each case the contiguous edges of the lenses were distinctly visible to the eye of the wearer.

My present invention provides the main lens which is either plain or ground to accommodate the vision of the wearer, with steps or shoulders at its lower edge. In the reduced portion thus provided are arranged the two lenses, as shown in Fig. 2, said lenses when in position not increasing the thickness of the main lens.

In the drawings, 1 indicates the main lens which is provided with shoulders $a$ and $b$.

2 is the reading lens, socalled, which is fitted in position against the shoulder $b$ and so as to be flush therewith.

3 is the lens for intermediate vision, which lens is fitted against the shoulder $a$ and over the lens 2.

In speaking of the lenses 2 and 3 as being reading and intermediate lenses it will be understood that neither of these lenses separately would serve as such but only in combination with the main lens 1 or said main lens and each other. The lenses thus assembled are practically no thicker than the main lens, and consequently there is no added weight. The lenses 2 and 3 can be cemented or fused in position on the main lens 1 in a manner well-known to those skilled in the art.

Having thus described the invention, what is claimed as new and desired to be secured by Letters Patent is:

1. In a lens for eye glasses, the combination with a main lens for long distance vision, said lens being reduced in thickness at its lower portion and provided with shoulders, of a lens for short-distance or reading vision arranged in said reduced portion and flush with one of said shoulders, and a lens for intermediate vision arranged over the short distance lens and against the other of said shoulders; substantially as described.

2. In a lens for eye glasses, the combination with a main lens focalized for long distance vision, the lower portion of said lens being reduced in thickness and provided with a shoulder, of a lens for short distance or reading vision arranged in said reduced portion and against said shoulder, and a lens for intermediate vision arranged over said short distance lens and covering the joint between said short distance lens and said shoulder; substantially as described.

In testimony whereof I hereunto affix my signature in the presence of two witnesses, this 17th day of April 1908.

WILLIAM K. KIGHT.

Witnesses:
E. E. GUNTER,
GEO. W. HOWELL.